United States Patent
Patel et al.

(10) Patent No.: US 10,823,416 B2
(45) Date of Patent: Nov. 3, 2020

(54) PURGE COOLING STRUCTURE FOR COMBUSTOR ASSEMBLY

(71) Applicant: General Electric Company, Schenectady, NY (US)

(72) Inventors: Nayan Vinodbhai Patel, Liberty Township, OH (US); Daniel Kirtley, Blue Ash, OH (US); Duane Douglas Thomsen, Lebanon, OH (US); Neeraj Kumar Mishra, Bangalore (IN); Adam Robert Kahn, Mason, OH (US)

(73) Assignee: General Electric Company, Schenectady, NY (US)

( * ) Notice: Subject to any disclaimer, the term of this patent is extended or adjusted under 35 U.S.C. 154(b) by 304 days.

(21) Appl. No.: 15/673,882

(22) Filed: Aug. 10, 2017

(65) Prior Publication Data

US 2019/0049113 A1 Feb. 14, 2019

(51) Int. Cl.
| | |
|---|---|
| *F23R 3/04* | (2006.01) |
| *F23R 3/00* | (2006.01) |
| *F23R 3/28* | (2006.01) |
| *F23R 3/12* | (2006.01) |
| *F23R 3/14* | (2006.01) |

(52) U.S. Cl.
CPC ........... *F23R 3/04* (2013.01); *F23R 3/002* (2013.01); *F23R 3/12* (2013.01); *F23R 3/14* (2013.01); *F23R 3/283* (2013.01); *F23R 3/286* (2013.01)

(58) Field of Classification Search
CPC .... F23R 3/002; F23R 3/04; F23R 3/10; F23R 3/12; F23R 3/14; F23R 3/28; F23R 3/286; F23R 2900/03042; F05D 2260/201; F05D 2260/202
See application file for complete search history.

(56) References Cited

U.S. PATENT DOCUMENTS

| | | | | |
|---|---|---|---|---|
| 5,623,827 | A | * | 4/1997 | Monty ...................... F23R 3/10 60/747 |
| 5,956,955 | A | * | 9/1999 | Schmid ................... F23R 3/283 60/748 |
| 6,179,608 | B1 | | 1/2001 | Kraemer et al. |
| 6,389,815 | B1 | | 5/2002 | Hura et al. |
| 6,609,380 | B2 | | 8/2003 | Mick et al. |

(Continued)

*Primary Examiner* — Todd E Manahan
*Assistant Examiner* — David P. Olynick
(74) *Attorney, Agent, or Firm* — Dority & Manning, P.A.

(57) ABSTRACT

The present disclosure is directed to a combustor assembly for a gas turbine engine comprising a bulkhead wall extended generally along a radial direction relative to a combustor centerline and a mixer disposed concentric to the nozzle centerline. The bulkhead wall defines one or more openings therethrough adjacent to a combustion chamber. Each of the openings defines a nozzle centerline extended along a lengthwise direction. The mixer comprises a retaining wall extended along a radial direction relative to the nozzle centerline and coupled to the upstream side of the bulkhead wall. The mixer further comprises an annular shroud extended at least partially through the one or more openings of the bulkhead wall. The mixer defines a cooling passage through the retaining wall and the annular shroud. The cooling passage defines an inlet opening through the retaining wall and an outlet opening through the annular shroud.

20 Claims, 5 Drawing Sheets

(56) References Cited

U.S. PATENT DOCUMENTS

| | | | | |
|---|---|---|---|---|
| 6,834,505 B2* | 12/2004 | Al-Roub | ............... | F23R 3/14 |
| | | | | 60/737 |
| 7,051,532 B2* | 5/2006 | Howell | ............... | F23L 15/04 |
| | | | | 60/756 |
| 7,415,826 B2* | 8/2008 | McMasters | ............ | F23R 3/286 |
| | | | | 60/748 |
| 7,788,929 B2* | 9/2010 | Biebel | ............... | F23R 3/283 |
| | | | | 60/752 |
| 8,312,724 B2 | 11/2012 | Dai et al. | | |
| 8,567,199 B2 | 10/2013 | Barton et al. | | |
| 10,233,775 B2* | 3/2019 | Bunker | ............... | F01D 5/186 |
| 2006/0064983 A1* | 3/2006 | Currin | ............... | F23R 3/14 |
| | | | | 60/748 |
| 2007/0017224 A1* | 1/2007 | Li | ............... | F23R 3/14 |
| | | | | 60/748 |
| 2008/0295519 A1* | 12/2008 | Park | ............... | F23R 3/28 |
| | | | | 60/740 |
| 2012/0186258 A1* | 7/2012 | Dai | ............... | F23R 3/14 |
| | | | | 60/748 |
| 2013/0004906 A1* | 1/2013 | Brown | ............... | F23R 3/14 |
| | | | | 431/354 |
| 2015/0285502 A1* | 10/2015 | DiCintio | ............... | F23R 3/283 |
| | | | | 60/737 |
| 2016/0245522 A1* | 8/2016 | Dai | ............... | F23R 3/283 |

* cited by examiner

PURGE COOLING STRUCTURE FOR COMBUSTOR ASSEMBLY

FIELD

The present subject matter relates generally to gas turbine engine combustion assemblies. More particularly, the present subject matter relates to a contoured premixing fuel injector assembly for gas turbine engine combustors.

BACKGROUND

Aircraft and industrial gas turbine engines include a combustor in which fuel is burned to input heat to the engine cycle. Typical combustors incorporate one or more fuel nozzles disposed through a swirler or mixer. The fuel nozzles introduce fuel into an air flow stream conditioned by the mixer so that it can atomize and burn.

However, the mixer, as well as surrounding portions of the combustion section, generally experience high temperatures due to interaction with combustion gases within the combustion chamber. These combustion gases, and the proximity of the mixer thereto, generally wear and deteriorate the mixer, thereby leading to damage and failure.

Known structures for mitigating deterioration include appropriating quantities of air for cooling. However, known structures are generally inefficient, such as by using large quantities of air for cooling the mixer and surrounding areas. As such, there is a need for cooling structures that may improve mixer cooling, decrease wear and deterioration, and improve gas turbine efficiency.

BRIEF DESCRIPTION

Aspects and advantages of the invention will be set forth in part in the following description, or may be obvious from the description, or may be learned through practice of the invention.

The present disclosure is directed to a combustor assembly for a gas turbine engine comprising a bulkhead wall extended generally along a radial direction relative to a combustor centerline and a mixer disposed concentric to the nozzle centerline. The bulkhead wall defines one or more openings therethrough adjacent to a combustion chamber. Each of the openings defines a nozzle centerline extended along a lengthwise direction. The mixer comprises a retaining wall extended along a radial direction relative to the nozzle centerline and coupled to the upstream side of the bulkhead wall. The mixer further comprises an annular shroud extended at least partially through the one or more openings of the bulkhead wall. The mixer defines a cooling passage through the retaining wall and the annular shroud. The cooling passage defines an inlet opening through the retaining wall and an outlet opening through the annular shroud.

In various embodiments, the bulkhead wall defines a radial portion extended generally perpendicular to the combustor centerline along the radial direction, a lengthwise portion extended generally co-linear to the nozzle centerline, and a conical portion extended at an acute angle relative to the radial portion and the lengthwise portion. In one embodiment, the outlet opening of the cooling passage is defined at an acute angle approximately equal to the acute angle of the conical portion of the bulkhead wall. In another embodiment, the outlet opening is defined inward of the lengthwise portion along the radial direction, the outlet opening configured to provide a flow of fluid onto the lengthwise portion of the bulkhead wall.

In one embodiment, the cooling passage defines a decreasing cross sectional area from approximately the inlet opening to approximately the outlet opening.

In various embodiments, the mixer defines one or more members extended at least partially along the radial direction relative to the nozzle centerline, the one or more members each defining a plurality of cooling passages through the mixer. In one embodiment, each cooling passage is defined within the mixer by two or more members extended at least partially along the radial direction and at least partially along the lengthwise direction. In another embodiment, the plurality of cooling passages is disposed in circumferential arrangement around the nozzle centerline.

In still other embodiments, the cooling passage further defines a circumferential passage within the annular shroud of the mixer, the circumferential passage extended at least partially circumferentially through the annular shroud of the mixer. In one embodiment, a plurality of the outlet openings is defined on the annular shroud in circumferential arrangement relative to the nozzle centerline, and wherein the plurality of outlet openings are each in fluid communication with the circumferential passage of the cooling passage. In another embodiment, the plurality of outlet openings is defined at two or more locations on the annular shroud along the lengthwise direction.

In various embodiments, the cooling passage defines an outlet passage disposed generally along the radial direction from the nozzle centerline in direct fluid communication with the outlet opening. In still various embodiments, the outlet passage is disposed at least partially along the lengthwise direction and at least partially along the radial direction from the nozzle centerline, wherein the outlet passage defines an oblique angle relative to the outlet. In one embodiment, the outlet passage is disposed at least partially along the circumferential direction relative to the nozzle centerline. In another embodiment, the outlet passage is disposed at least partially along the lengthwise direction, wherein the outlet passage is extended toward the combustion chamber at a downstream end of the outlet passage.

Another aspect of the present disclosure is directed to a gas turbine engine comprising a combustor assembly. The combustor assembly comprises a bulkhead wall extended generally along a radial direction relative to a combustor centerline. The bulkhead wall defines one or more openings extended therethrough adjacent to a combustion chamber. Each of the openings defines a nozzle centerline extended along a lengthwise direction. The combustor assembly further comprises a mixer disposed concentric to the nozzle centerline. The mixer comprises a retaining wall extended along a radial direction relative to the nozzle centerline and coupled to the upstream side of the bulkhead wall. The mixer further comprises an annular shroud extended at least partially through the one or more openings of the bulkhead wall. The mixer defines a cooling passage through the retaining wall and the annular shroud. The cooling passage defining an inlet opening through the retaining wall and an outlet opening through the annular shroud.

In one embodiment of the gas turbine engine, the bulkhead wall of the combustor assembly defines a radial portion extended generally perpendicular to the combustor centerline along the radial direction, a lengthwise portion extended generally co-linear to the nozzle centerline, and a conical portion extended at an acute angle relative to the radial portion and the lengthwise portion.

In another embodiment of the gas turbine engine, the outlet opening of the combustor assembly is defined inward of the lengthwise portion along the radial direction, the outlet opening configured to provide a flow of fluid onto the lengthwise portion of the bulkhead wall.

In still another embodiment, the mixer defines one or more members extended at least partially along the radial direction relative to the nozzle centerline, the one or more members each defining a plurality of cooling passages through the mixer.

In yet another embodiment, the plurality of outlets is defined at two or more locations on the annular shroud along the lengthwise direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
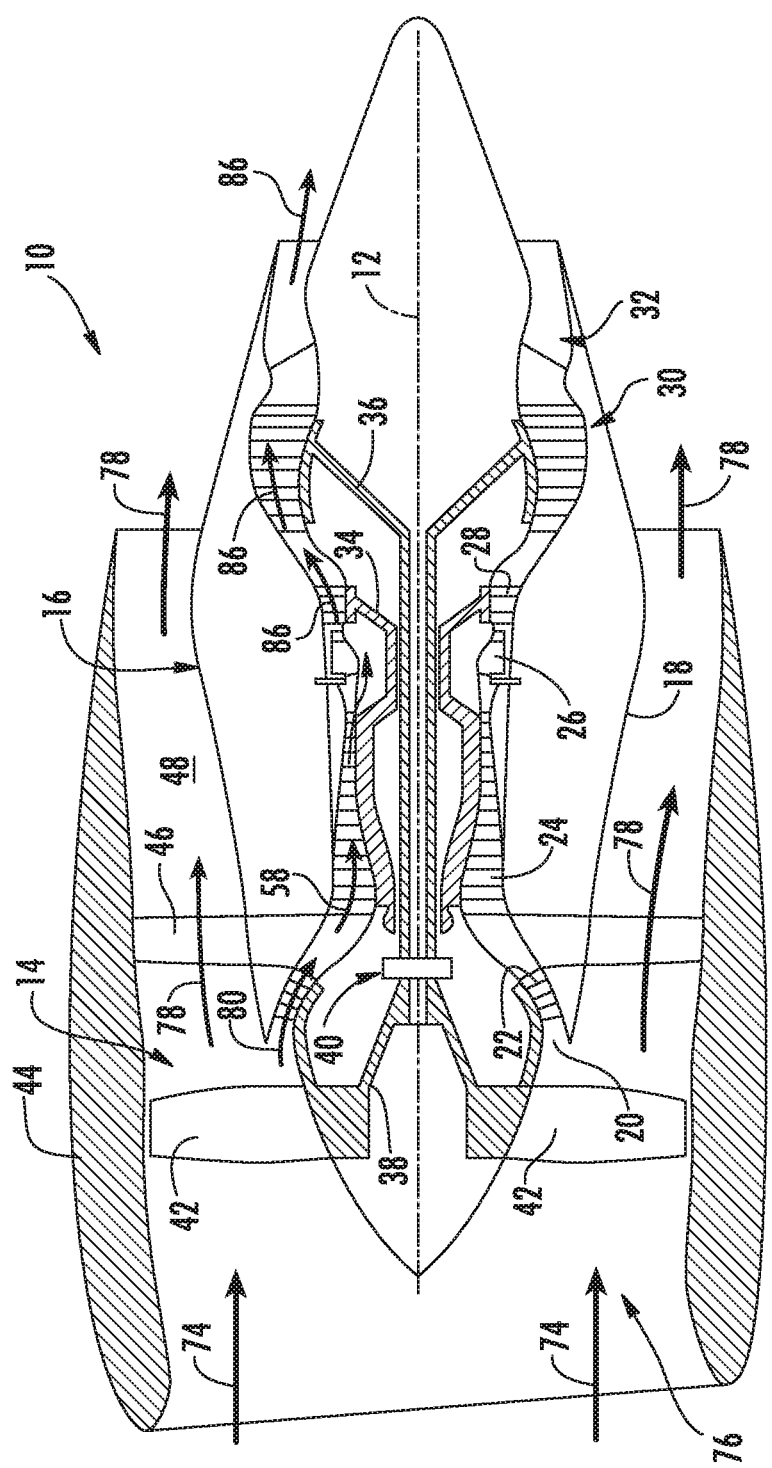
FIG. 1 is a schematic cross-sectional view of an exemplary gas turbine engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of a combustor assembly are generally provided that may improve mixer cooling, decrease wear and deterioration, and improve gas turbine efficiency. The mixer of the combustor assembly generally appropriates cooling air for conductive cooling of the mixer while further providing a curtain, jet, or buffer of cooling air purged from an outlet opening within the mixer. As such, thermal attenuation (e.g., cooling) of the mixer and surrounding structures is generally provided while improving gas turbine engine efficiency by reducing a quantity of air utilized for cooling.

Referring now to the drawings, FIG. 1 is a schematic partially cross-sectioned side view of an exemplary gas turbine engine 10 herein referred to as "engine 10" as may incorporate various embodiments of the present invention. As shown in FIG. 1, the engine 10 has a longitudinal or axial centerline axis 12 that extends there through for reference purposes. In general, the engine 10 may include a fan assembly 14 and a core turbine engine or gas turbine engine 16 disposed downstream from the fan assembly 14.

The gas turbine engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the gas turbine engine 16. It should be appreciated by those of ordinary skill in the art that the nacelle 44 may be configured to be supported relative to the gas turbine engine 16 by a plurality of circumferentially-spaced outlet guide vanes or struts 46. Moreover, at least a portion of the nacelle 44 may extend over an outer portion of the gas turbine engine 16 so as to define a bypass airflow passage 48 therebetween.

Figure 2:
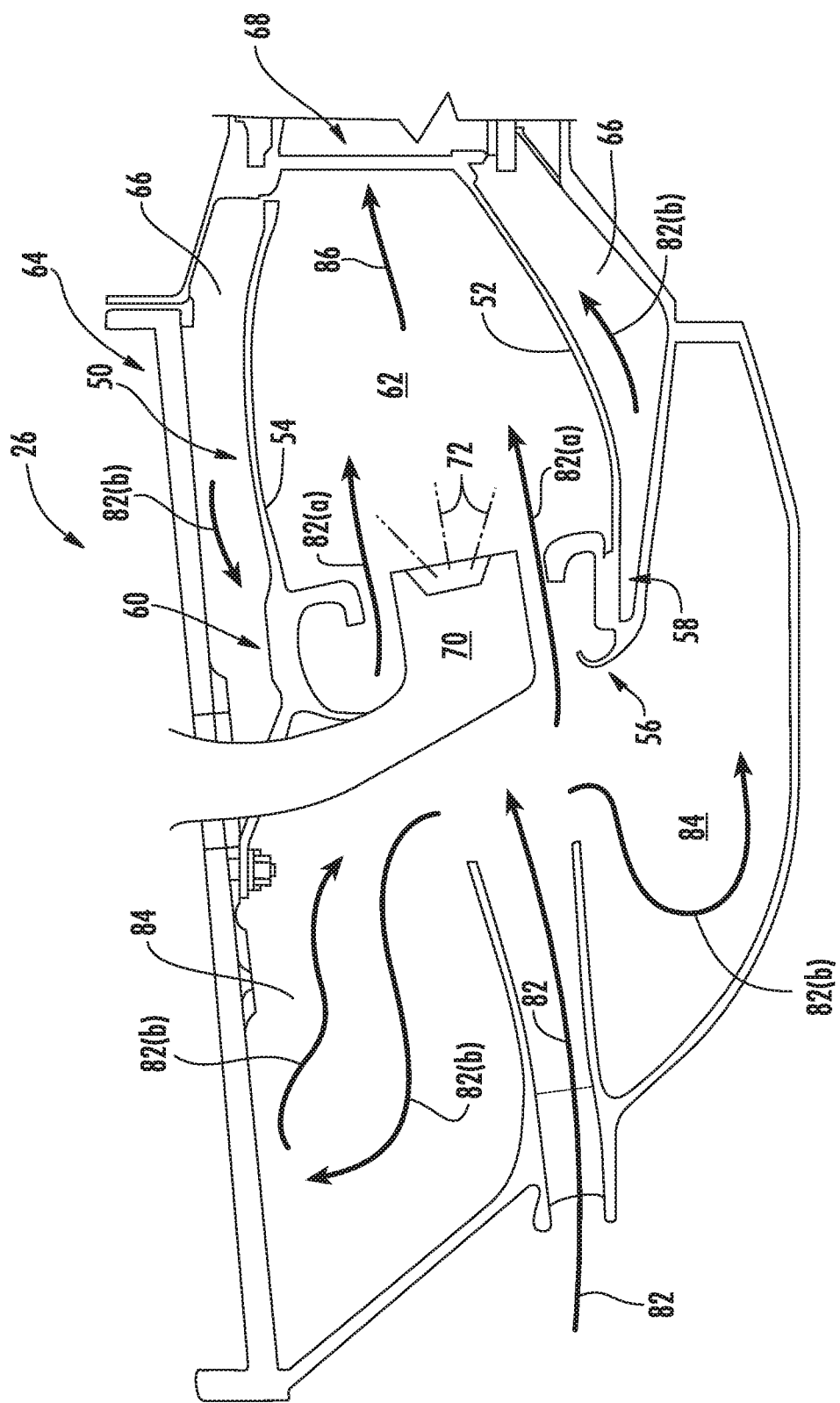
FIG. 2 is a cross sectional side view of an exemplary combustion section of the gas turbine engine as shown in FIG. 1.

FIG. 2 is a cross sectional side view of an exemplary combustion section 26 of the gas turbine engine 16 as shown in FIG. 1. As shown in FIG. 2, the combustion section 26 may generally include an annular type combustor assembly 50 having an annular inner liner 52, an annular outer liner 54 and a bulkhead wall 56 that extends radially between upstream ends 58, 60 of the inner liner 52 and the outer liner 54 respectfully. As shown in FIG. 2, the inner liner 52 is radially spaced from the outer liner 54 with respect to combustor centerline 13 or axial centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

The bulkhead wall 56 is extended generally along a radial direction relative to the combustor centerline 13. The bulkhead wall 56 defines one or more openings 55 through which a fuel nozzle 70 may extend at least partially. The fuel nozzle 70 provides a liquid or gaseous fuel 72 (or combinations thereof) to the combustion chamber 62. Each of the openings 55 through the bulkhead wall 56 defines a nozzle centerline 11 therethrough extended along a lengthwise direction L.

As shown in FIG. 2, the inner liner 52 and the outer liner 54 may be encased within a diffuser or outer casing 64. An outer flow passage 66 may be defined around the inner liner 52 and/or the outer liner 54. The inner liner 52 and the outer liner 54 may extend from the bulkhead wall 56 towards a turbine nozzle or inlet 68 to the HP turbine 28 (FIG. 1), thus at least partially defining a hot gas path between the combustor assembly 50 and the HP turbine 28.

Referring still to FIG. 2, the combustor assembly 50 further includes a swirler or mixer 100 disposed at least partially through the opening 55 of the bulkhead wall 56. Each mixer 100 is disposed generally or approximately concentric to the nozzle centerline 11 extended generally through the center of each opening 55. However, it should be appreciated that the mixer 100 may be retained or coupled to the bulkhead wall 56 such as the mixer 100 is at least partially moveable or adjustable relative to a radial direction RR extended from the nozzle centerline 11. As such, the mixer 100 may be eccentric to the nozzle centerline 11, or approximately concentric to the nozzle centerline 11 when the fuel nozzle 70 is disposed through the mixer 100.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows into a diffuser cavity or head end portion 84 of the combustion section 26.

The compressed air 82 pressurizes the diffuser cavity 84. A first portion of the of the compressed air 82, as indicated schematically by arrows 82(a) flows from the diffuser cavity 84 into the combustion chamber 62 where it is mixed with the fuel 72 and burned, thus generating combustion gases, as indicated schematically by arrows 86, within the combustor assembly 50. Typically, the LP and HP compressors 22, 24 provide more compressed air to the diffuser cavity 84 than is needed for combustion. Therefore, a second portion of the compressed air 82 as indicated schematically by arrows 82(b) may be used for various purposes other than combustion. For example, as shown in FIG. 2, compressed air 82(b) may be routed into the outer flow passage 66 to provide cooling to the inner and outer liners 52, 54. In addition or in the alternative, at least a portion of compressed air 82(b) may be routed out of the diffuser cavity 84. For example, a portion of compressed air 82(b) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the gas turbine engine 16 to provide propulsive thrust.

During operation of the engine 10, the mixer 100 through which the fuel nozzle 70 extends provides a flow of air to the fuel nozzle 70 for mixing with the liquid or gaseous fuel. The air, such as air 82 shown schematically in FIG. 8, enters through a plurality of vanes defined around the mixer 100, such as disposed in circumferential arrangement around the nozzle centerline 11. The plurality of vanes around the mixer 100 may generally direct the flow of air 82 in a tangential direction such as to aide or improve mixing of the air 82 with the fuel.

Figure 3:
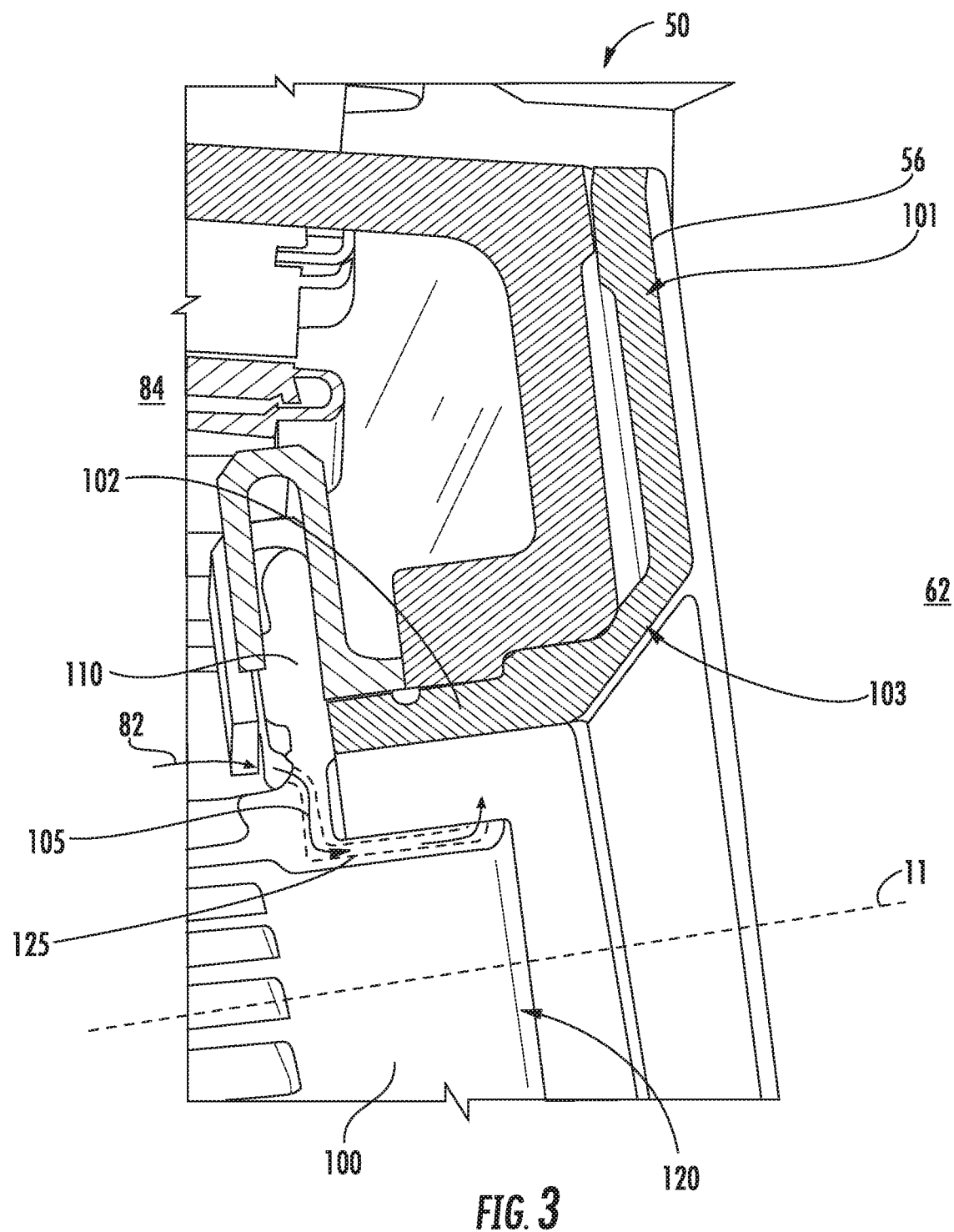
FIG. 3 is an axial cross sectional view of an exemplary embodiment of a portion of the combustion section generally provided in FIG. 2.

Referring now to FIG. 3, an axial cross sectional view of an exemplary embodiment of the mixer 100 is generally provided. The mixer 100 includes a retaining wall 110 extended along the radial direction RR relative to the nozzle centerline 11. The mixer 100 may be coupled to an upstream side of the bulkhead wall 56. The mixer 100 further includes an annular shroud 120 extended at least partially through the one or more openings 55 of the bulkhead wall 56. The mixer 100 defines a cooling passage 130 through the retaining wall 110 and the annular shroud 120. The retaining wall 110 defines an inlet opening 115 (further shown in the perspective view embodiment shown in FIG. 4) extended therethrough to the cooling passage 130. The annular shroud 120 defines an outlet opening 125 extended therethrough to the cooling passage 130 (further shown in the perspective view embodiment shown in FIG. 5).

The retaining wall 110 defines the inlet opening 115 at an upstream end of the cooling passage 130 adjacent to the diffuser cavity 84. For example, the diffuser cavity 84 may generally define a compressor exit pressure (e.g., Station 3.0 pressure). The inlet opening 115 of the mixer 100 is defined generally in fluid communication with the diffuser cavity 84 (e.g., generally upstream of the combustion chamber 62).

The annular shroud 120 defines the outlet opening 125 at a downstream end of the cooling passage 130 adjacent to the combustion chamber 62. During operation of the engine 10, a portion of the compressed air 82 in the diffuser cavity 84 flows through the cooling passage 130 from the inlet opening 115 through the outlet opening 125, such as shown schematically by arrows 105. The flow of air 105 through the cooling passage 130 provides cooling to the mixer 100, such as the retainer wall 110 and the annular shroud 120. Additionally, the flow of air 105 provides cooling to the bulkhead wall 56, such as by providing a jet or buffer of air 105 at the bulkhead wall 56. The jet or buffer of air 105 generally provides a cooling buffer between the bulkhead wall 56 and combustion gases 86 from the combustion chamber 62. By providing cooling to the mixer 100 and buffer cooling at the bulkhead wall 56, the mixer 100 may reduce an overall amount of air 82 from the diffuser cavity 84 utilized for cooling the mixer 100 and bulkhead wall 56, thereby improving engine 10 efficiency and durability.

In various embodiments, the bulkhead wall 56 defines a radial portion 101 extended generally perpendicular to the combustor centerline 13. For example, the radial portion 101 of the bulkhead wall 56 may extend generally along the radial direction R from the combustor centerline 13. The bulkhead wall 56 may further define a lengthwise portion 102 extended generally co-linear to the nozzle centerline 11. The lengthwise portion 102 is at least partially parallel and adjacent to the annular shroud 120 of the mixer 100. For example, the lengthwise portion 102 generally surrounds the annular shroud 120 of the mixer 100. As such, the lengthwise portion 102 extends generally annularly around the nozzle centerline 11 and defines each opening 55 within the bulkhead wall 56.

Referring still to FIG. 3, the outlet opening 125 is defined inward along the radial direction RR of the lengthwise portion 102 of the bulkhead wall 56. For example, the outlet opening 125 is defined within the opening 55 of the bulkhead wall 56. The mixer 100, and more specifically the cooling passage 130 including the outlet opening 125, provides the flow of air 105 onto the lengthwise portion 102 of the bulkhead wall 56.

The bulkhead wall 56 may further include a conical portion 103 extended at an acute angle relative to the radial portion 101 and the lengthwise portion 102. For example, the conical portion 103 may extend from a downstream end of the lengthwise portion 102 to the radial portion 101 of the bulkhead wall 56 at an oblique angle, such as an angle greater than approximately 0 degrees (i.e., 0 degrees is parallel or co-linear to the nozzle centerline 11) and less than approximately 90 degrees (i.e., 90 degrees is perpendicular to the nozzle centerline 11).

Referring still to FIG. 3, in various embodiments, the cooling passage 130 defines an outlet passage 135 disposed generally along the radial direction RR from the nozzle centerline 11 in direct fluid communication with the outlet opening 125. The outlet passage 135 generally defines a portion of the cooling passage 130 disposed at least partially along the lengthwise direction L and at least partially along the radial direction RR from the nozzle centerline 11. In one embodiment, the outlet passage 135 defines an oblique angle relative to the outlet opening 125.

In still various embodiments, the outlet passage 135 is disposed at least partially along a circumferential direction C relative to the nozzle centerline 11.

In one embodiment, the outlet passage 135 is disposed at least partially along the lengthwise direction L. The outlet passage 135 may extend toward the combustion chamber 62 at a downstream end of the outlet passage 135.

Referring still to FIG. 3, the cooling passage 130 may define a decreasing cross sectional area from approximately the inlet opening 115 to approximately the outlet opening 125. For example, the cooling passage 130 may generally define a nozzle assembly that may accelerate the flow of air 105 through the cooling passage 130 from the inlet opening 115 through the outlet opening 125 and onto the bulkhead wall 56.

Figure 6:
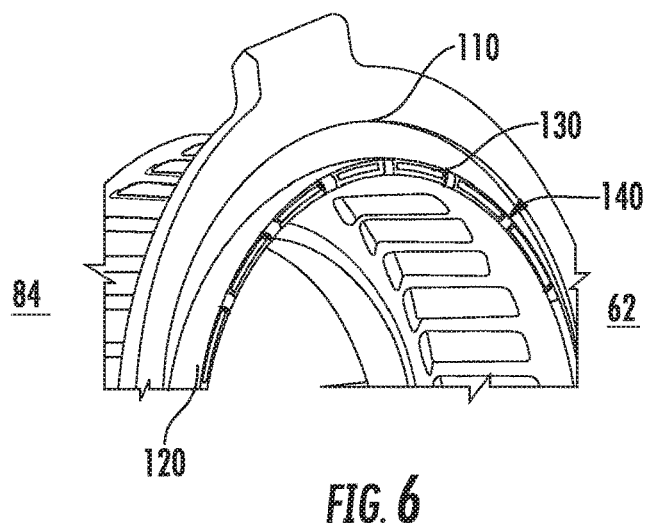
FIG. 6 is a cutaway perspective view of an exemplary embodiment of a mixer of the combustion section of FIG. 3.
Figure 7:
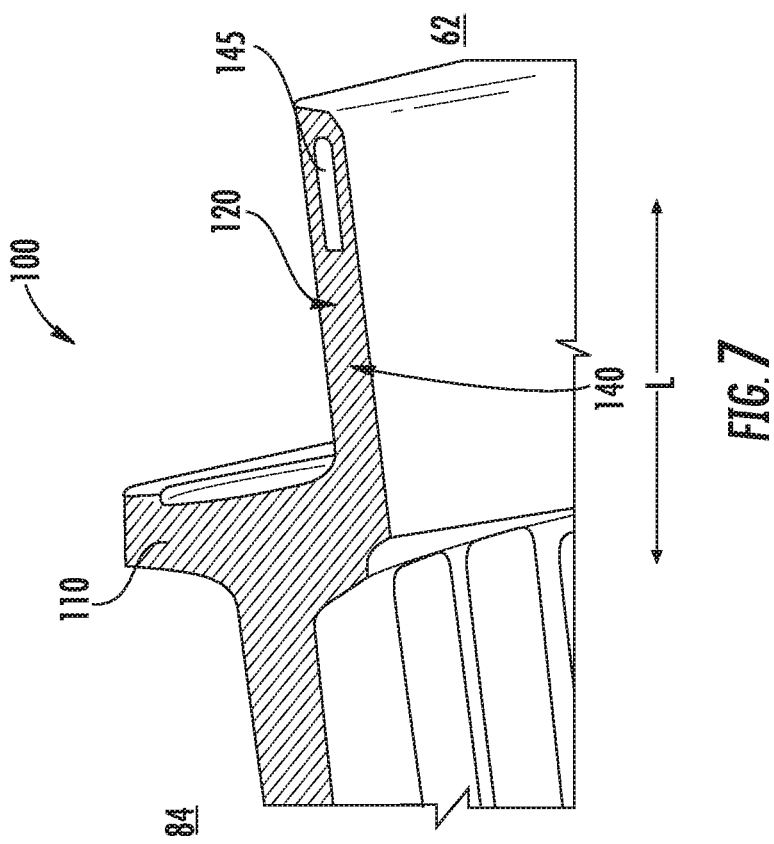
FIG. 7 is an axial cross sectional view of an exemplary embodiment of a mixer of the combustion section of FIG. 3.

Referring now to FIG. 6, a perspective view of another embodiment of the mixer 100 is generally provided. In the embodiment shown in FIG. 6, a portion of the annular shroud 120 is cut to show in further detail a plurality of cooling passages 130 defined within the annular shroud 120 of the mixer 100. Referring to the axial cross sectional view generally provided in FIG. 7, in conjunction with FIG. 6, the mixer 100 further includes two or more members 140 extended within the mixer 100. The members 140 generally separate or define the plurality of cooling passages 130 within the mixer 100 in circumferential arrangement around the nozzle centerline 11. Referring to FIG. 7, the member 140 generally defines a wall within the annular shroud 120 fluidly disconnecting circumferentially adjacent cooling passages 130 within the annular shroud 120.

Figure 4:
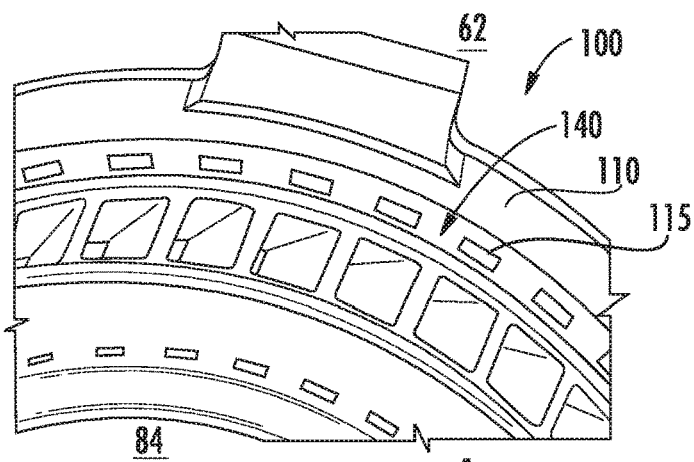
FIG. 4 is a perspective view of a portion of an exemplary embodiment of a mixer of the combustion section of FIG. 3.
Figure 5:
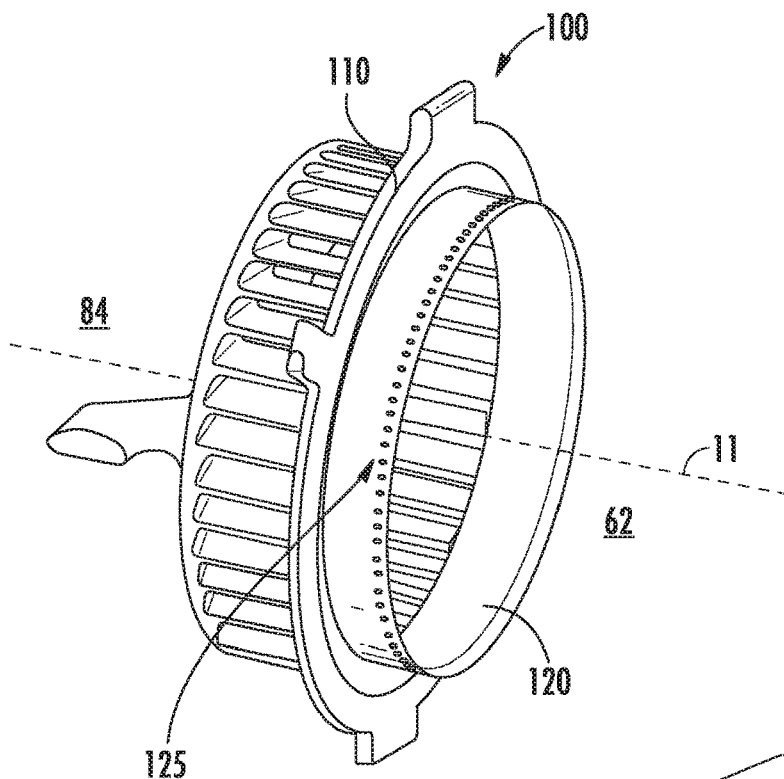
FIG. 5 is a perspective view of another exemplary embodiment of a mixer of the combustion section of FIG. 3.

Referring to FIGS. 4 and 6, the mixer 100 may define the cooling passage 130, the inlet opening 115, or both as slots extended at least partially along the circumferential direction C (defined around the nozzle centerline 11). Each cooling passages 130, inlet opening 115, or both, is separated from one another by the member 140 defined within the mixer 100. For example, the inlet opening 115, the cooling passage 130, or both may define a generally rectangular cross section or polygonal cross section. In other embodiments, the inlet opening 115, the cooling passage 130, or both may define a circular, ovular, elliptical, teardrop, or generally oblong cross section.

Referring now to FIG. 7, the member 140 extended at least partially along the lengthwise direction L and the annular shroud 120 further defines a circumferential passage 145 of the cooling passage 130 within the annular shroud 120. The circumferential passage 145 is in fluid communication with the plurality of outlet opening 125 defined on the annular shroud 120.

Figure 8:
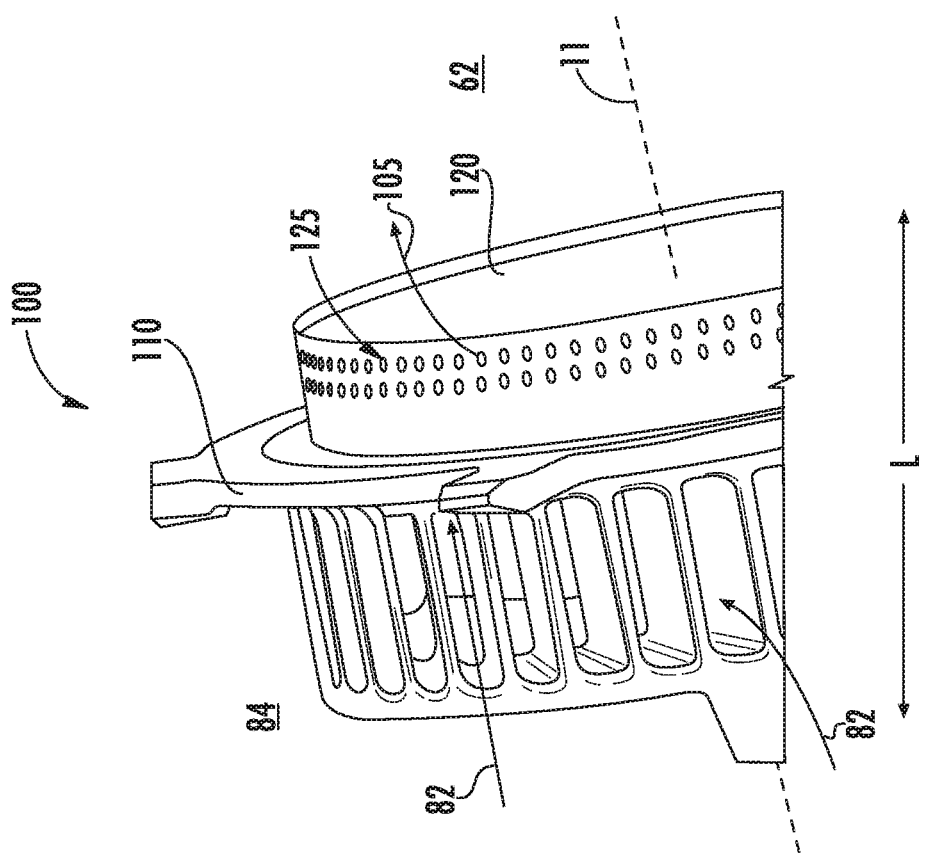
FIG. 8 is a perspective view of another exemplary embodiment of a mixer of the combustion section of FIG. 3.

Referring now to a perspective view of an exemplary embodiment of the mixer 100 shown in FIG. 8, the plurality of outlet openings 125 are defined at two or more locations on the annular shroud along the lengthwise direction L. For example, the plurality of outlet openings 125 may be staggered along the lengthwise direction L. The flow of air 105 through the cooling passage 130 may egress through the outlet opening 125 at a plurality of locations along the lengthwise direction L onto the bulkhead wall 56, such as, but not limited to, the lengthwise portion 101 of the bulkhead wall 56.

Referring still to FIG. 8, one or more of the outlet openings 125 may define a circular, ovular, or elliptical cross section. In other embodiments, one or more of the outlet openings 125 may define a rectangular, polygonal, teardrop, or generally oblong cross section.

All or part of the combustor assembly 50, including, but not limited to, the mixer 100, the bulkhead wall 56, or combinations thereof, may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the combustor assembly. Furthermore, the combustor assembly may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include nickel and cobalt-based alloys.

The foregoing has described a combustor assembly for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine, the combustor assembly comprising:
    a bulkhead wall extended along a radial direction relative to nozzle centerline, the bulkhead wall defining one or more openings therethrough adjacent to a combustion chamber, each of the openings defining the nozzle centerline extended along a lengthwise direction; and
    a mixer disposed concentric to the nozzle centerline, wherein the mixer comprises:
    a retaining wall extended along the radial direction relative to the nozzle centerline and coupled to the upstream side of the bulkhead wall,
    an annular shroud extended at least partially through the one or more openings of the bulkhead wall,
    an inlet opening, and an outlet opening formed in the annular shroud, and
    wherein a cooling passage is formed between the inlet opening and the outlet opening, passing through the retaining wall and opening towards the bulkhead wall through the outlet opening in the annular shroud and,
    wherein the outlet opening of the cooling passage is defined at an acute angle relative to the nozzle centerline.

2. The combustor assembly of claim 1,
    wherein the bulkhead wall defines a radial portion extended perpendicular to the nozzle centerline along the radial direction, a lengthwise portion extended parallel to the nozzle centerline, and a conical portion extended at an acute angle relative to the radial portion and the lengthwise portion.

3. The combustor assembly of claim 2, wherein the acute angle of the outlet opening of the cooling passage is equal to the acute angle of the conical portion of the bulkhead wall.

4. The combustor assembly of claim 2, wherein the outlet opening is defined inward of the lengthwise portion along the radial direction, the outlet opening configured to provide a flow of fluid onto the lengthwise portion of the bulkhead wall.

5. The combustor assembly of claim 1, wherein the cooling passage defines a decreasing cross sectional area from the inlet opening to the outlet opening.

6. The combustor assembly of claim 1, wherein the mixer defines one or more members extended at least partially along the radial direction relative to the nozzle centerline, the one or more members each defining a plurality of cooling passages through the mixer.

7. The combustor assembly of claim 6, wherein each cooling passage is defined within the mixer by two or more members extended at least partially along the radial direction and at least partially along the lengthwise direction.

8. The combustor assembly of claim 6, wherein the plurality of cooling passages is disposed in circumferential arrangement around the nozzle centerline.

9. The combustor assembly of claim 6, wherein the cooling passage further defines a circumferential passage within the annular shroud of the mixer, the circumferential passage extended at least partially circumferentially through the annular shroud of the mixer.

10. The combustor assembly of claim 9, wherein a plurality of the outlet openings is defined on the annular shroud in circumferential arrangement relative to the nozzle centerline, and wherein the plurality of outlet openings are each in fluid communication with the circumferential passage of the cooling passage.

11. The combustor assembly of claim 10, wherein the plurality of outlet openings is defined at two or more locations on the annular shroud along the lengthwise direction.

12. The combustor assembly of claim 1, wherein the cooling passage defines an outlet passage disposed along the radial direction from the nozzle centerline in direct fluid communication with the outlet opening.

13. The combustor assembly of claim 12, wherein the outlet passage is disposed at least partially along the lengthwise direction and at least partially along the radial direction from the nozzle centerline, wherein the outlet passage defines an oblique angle relative to the outlet opening.

14. The combustor assembly of claim 13, wherein the outlet passage is disposed at least partially along the circumferential direction relative to the nozzle centerline.

15. The combustor assembly of claim 13, wherein the outlet passage is disposed at least partially along the lengthwise direction, wherein the outlet passage is extended toward the combustion chamber at a downstream end of the outlet passage.

16. A gas turbine engine, the engine comprising:
    a combustor assembly comprising: a bulkhead wall extended along a radial direction relative to a nozzle centerline, the bulkhead wall defining one or more openings extended therethrough adjacent to a combustion chamber, each of the openings defining the nozzle centerline extended along a lengthwise direction; and
    a mixer disposed concentric to the nozzle centerline, wherein the mixer comprises:
    a retaining wail extended alone the radial direction relative to the nozzle centerline and coupled to the upstream side of the bulkhead wall,
    an annular shroud extended at least partially through the one or more openings of the bulkhead wall,
    an inlet opening, and
    an outlet opening formed in the annular shroud, and
    wherein a cooling passage is formed between the inlet opening and the outlet opening, passing through the retaining wall and opening towards the bulkhead wall through the outlet opening in the annular shroud and,
    wherein the outlet opening of the cooling passage is defined at an acute angle relative to the nozzle centerline.

17. The gas turbine engine of claim 16,
    wherein the bulkhead wall of the combustor assembly defines a radial portion extended perpendicular to the nozzle centerline along the radial direction, a lengthwise portion extended parallel to the nozzle centerline, and a conical portion extended at an acute angle relative to the radial portion and the lengthwise portion.

18. The gas turbine engine of claim 17, wherein the outlet opening of the combustor assembly is defined inward of the lengthwise portion along the radial direction, the outlet opening configured to provide a flow of fluid onto the lengthwise portion of the bulkhead wall.

19. The gas turbine engine of claim 16, wherein the mixer defines one or more members extended at least partially along the radial direction relative to the nozzle centerline, the one or more members each defining a plurality of cooling passages through the mixer.

20. The gas turbine engine of claim 16, wherein the plurality of outlets are defined at two or more locations on the annular shroud along the lengthwise direction.

* * * * *